United States Patent
Kim

(10) Patent No.: US 8,516,168 B2
(45) Date of Patent: Aug. 20, 2013

(54) APPARATUS AND METHOD FOR PREVENTING QUEUE OVERFLOW FOR HARD DISK DRIVE PROTECTION IN COMPUTER SYSTEM

(75) Inventor: Bum-Keun Kim, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 54 days.

(21) Appl. No.: 12/758,889

(22) Filed: Apr. 13, 2010

(65) Prior Publication Data

US 2010/0271725 A1    Oct. 28, 2010

(30) Foreign Application Priority Data

Apr. 28, 2009    (KR) .................. 10-2009-0037014

(51) Int. Cl.
    *G06F 13/10*    (2006.01)
(52) U.S. Cl.
    USPC .................................. 710/36; 710/6; 710/57

(58) Field of Classification Search
    None
    See application file for complete search history.

(56) References Cited

U.S. PATENT DOCUMENTS

| | | | |
|---|---|---|---|
| 5,737,481 A * | 4/1998 | Gushima et al. ............... 386/263 |
| 2001/0041062 A1 * | 11/2001 | Ottesen et al. ................ 386/125 |
| 2005/0213242 A1 * | 9/2005 | Fujiki et al. ..................... 360/75 |
| 2007/0104049 A1 * | 5/2007 | Kim et al. .................. 369/44.32 |
| 2008/0259496 A1 | 10/2008 | Shimotono et al. |
| 2010/0165146 A1 * | 7/2010 | Shimono et al. ......... 348/231.99 |
| 2012/0092249 A1 * | 4/2012 | Cornwell et al. ............. 345/156 |

* cited by examiner

*Primary Examiner* — Ilwoo Park
(74) *Attorney, Agent, or Firm* — Cha & Reiter, LLC.

(57) ABSTRACT

A queue overflow prevention method and apparatus for Hard Disk Drive (HDD) protection in a computer system is provided. The queue overflow prevention method includes measuring acceleration information of the system, determining if the system is in a stable status or an unstable status using the acceleration information, and, while the system is in the unstable status, restricting the generation of a disk Input/Output (I/O) request.

13 Claims, 6 Drawing Sheets

APPARATUS AND METHOD FOR PREVENTING QUEUE OVERFLOW FOR HARD DISK DRIVE PROTECTION IN COMPUTER SYSTEM

CLAIM OF PRIORITY

This application claims, under 35 U.S.C. §119(a), priority to and the benefit of the earlier filing date of the Korean Patent Application entitled, Apparatus and Method for Preventing Queue Overflow for Hard Disk Drive Protection in Computer System," filed in the Korean Intellectual Property Office on Apr. 28, 2009 and assigned Serial No. 10-2009-0037014, the contents of which are herein incorporated by reference.

BACKGROUND OF THE INVENTION

1. Field of the Invention

The present invention relates in the field of a computer system hard disk drives. More particularly, the present invention relates to an apparatus and method for restricting the generation of a disk Input/Output (I/O) request to prevent a queue overflow.

2. Description of the Related Art

In recent years, products mounting computer systems have quickly changed from a fixed form, such as desktop computers, to a mobile form such as laptop computers. Since the mobile equipments are often used during movement, the mobile equipments are highly possible to experience external impact such as vibration, falling, etc. Thus, technologies for protecting data within the mobile equipments from the external impact are needed. Particularly, among storage media constituting the computer system, the hard disk drive (HDD) is particularly vulnerable to the external impact. Thus, there is a need for a technology for protecting the HDD from the external impact.

As is known in the art, an HDD is an auxiliary memory device for storing and reading data while rotating a disk type aluminum substrate coated with magnetic substance, i.e., a platter. A magnetic head for reading data stored in a magnetic form is installed at a minute distance around the platter. The magnetic head moves left and right. If the magnetic head experiences high impact in any position on the platter, the magnetic head may come into direct contact with the platter and do damage to the platter surface. Thus, the magnetic head cannot physically read and write data onto the platter. Thus, the conventional art provides a technology for preventing damages by sensing the generation of vibration or impact through an accelerometer sensor and, before the impact is forwarded to HDD, moving the magnetic head to a safe zone.

FIG. 1 is a block diagram illustrating an apparatus configuration for protecting HDD in a computer system according to the conventional art.

Referring to FIG. 1, an HDD protection manager 100 receives an acceleration value periodically measured by an accelerometer sensor 104 via a sensor driver 102, and determines if a current system is in a stable status or an unstable status. If it is determined that the current system is in the unstable status, the HDD protection manager 100 requests an HDD filter driver 116 to move a magnetic head to a safe zone. If the system is changed from the unstable status to the stable status, the HDD protection manager 100 requests the HDD filter driver 116 to restore the magnetic head to the original position.

If the HDD filter driver 116 is requested to move the magnetic head to the safe zone, the HDD filter driver 116 sends a physical hard disk driver 124 a signal requesting movement of the magnetic head to the safe zone and allows time for the magnetic head to move to the safe zone. At this time, the HDD filter driver 116 prevents all I/O requests forwarded from an HDD driver 114 from being forwarded to an I/O control driver 122, using an I/O request flow controller 118. Thereby preventing the magnetic head of the physical hard disk driver 124 from going back onto a platter surface and being exposed to danger. That is, the HDD filter driver 116 stores all I/O requests forwarded from the HDD driver 114 in an internal I/O queue 120 so as not to forward the I/O request to the I/O control driver 122 while the unstable status is maintained, thereby protecting the physical hard disk driver 124. On the other hand, if the HDD protection manager 100 requests the HDD filter driver 116 restore the magnetic head to the original position, the HDD filter driver 116 can forward all I/O requests, which have been stored in the internal I/O queue 120, to the physical hard disk driver 124 via the I/O control driver 122, thereby allowing the magnetic head of the physical hard disk driver 124 to move onto the platter surface out of the safe zone and perform physical I/O.

The aforementioned conventional HDD protection technique has no problem in cases where a vibration or impact time is short and, during this time, a limited number disk I/O requests is generated. But, there is a problem that a queue overflow is generated in case where the vibration or impact time is very long or a large number disk I/O requests is generated within a short time and the number exceeds a capacity of the internal I/O queue 120. If the queue overflow is generated, the computer system enters a fatal state such as a hang up, a halt, or a Blue Screen Of Death (BSOD). Also, because a post process is impossible for the disk I/O request exceeding the capacity of the internal I/O queue 120, a user data loss is unavoidable.

To prevent the above problems, a queue may be increased in size, but there is generally a limit to a size of a memory assignable to the queue. Thus, there is a need for a different way to solve the above problems.

SUMMARY OF THE INVENTION

Accordingly, one aspect of the present invention is to provide a queue overflow prevention apparatus and method for Hard Disk Drive (HDD) protection in a computer system.

Another aspect of the present invention is to provide an apparatus and method for restricting the generation of a disk Input/Output (I/O) request to prevent a queue overflow in a computer system.

A further aspect of the present invention is to provide an apparatus and method for restricting the generation of a disk I/O request in the computer system, in case where a computer system is in an unstable status.

A yet another aspect of the present invention is to provide an apparatus and method for reducing a processing speed of the whole system at a hardware side to restrict the generation of a disk I/O request in the computer system, while a computer system is in an unstable status.

A still another aspect of the present invention is to provide an apparatus and method for freezing an operation of each process or controlling priority to restrict the generation of a disk I/O request in the computer system, while a computer system is in an unstable status.

A still another aspect of the present invention is to provide an apparatus and method for controlling a network throughput to restrict the generation of a disk I/O request in the computer system, while a computer system is in an unstable status.

According to one aspect of the present invention, a buffer overflow prevention method for HDD protection in a computer system is provided. The method includes measuring acceleration information of the system, determining if the system is in a stable status or an unstable status using the acceleration information, and, while the system is in the unstable status, restricting the generation of a disk I/O request.

According to another aspect of the present invention, a buffer overflow prevention method for HDD protection in a computer system is provided. The method includes a protection manager and an I/O request controller. The protection manager determines if the system is in a stable status or an unstable status using an acceleration value of the system. The I/O request controller restricts the generation of a disk I/O request while the system is in the unstable status.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

An apparatus and method for restricting the generation of a disk Input/Output (I/O) request in the computer system, while a computer system is in an unstable status, according to an exemplary embodiment of the present invention are described below.

Figure 1:
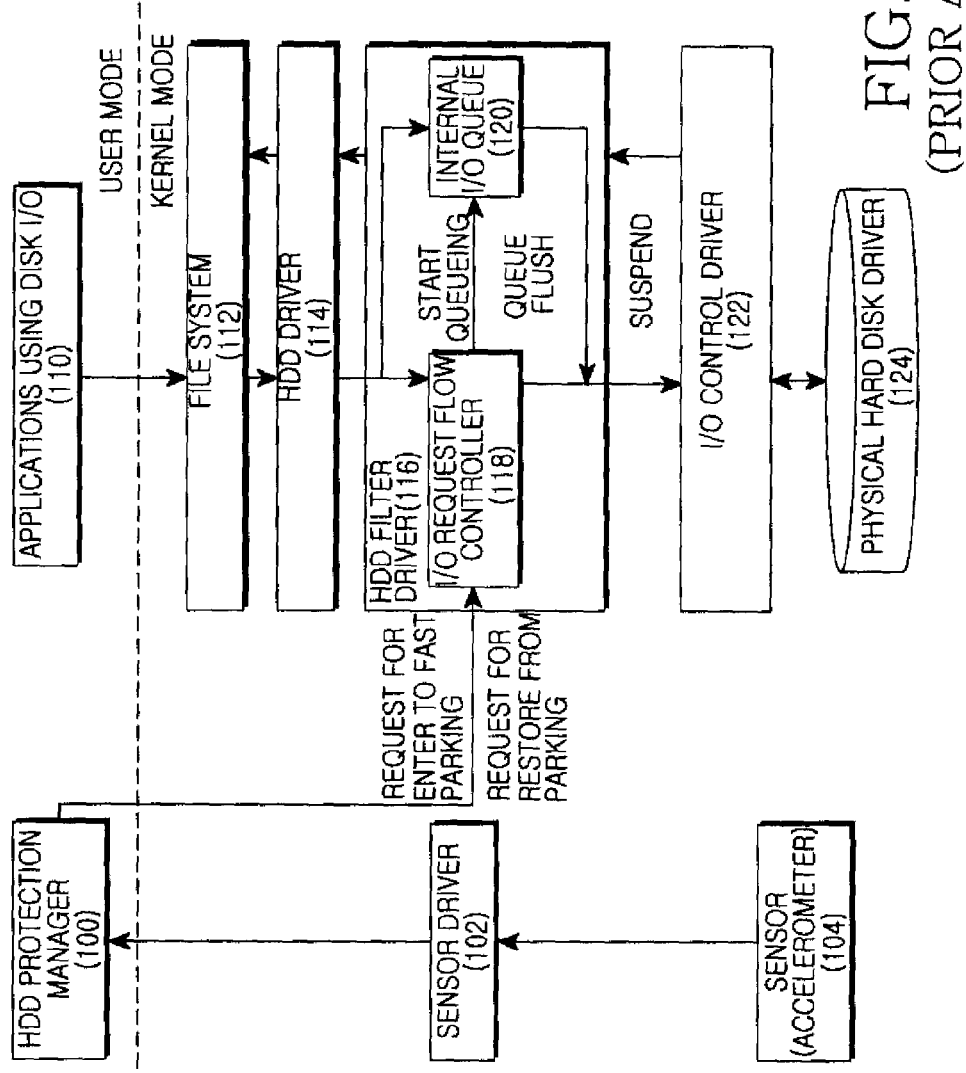
FIG. 1 is a block diagram illustrating a configuration for protecting Hard Disk Drive (HDD) in a computer system according to the conventional art.
Figure 2:
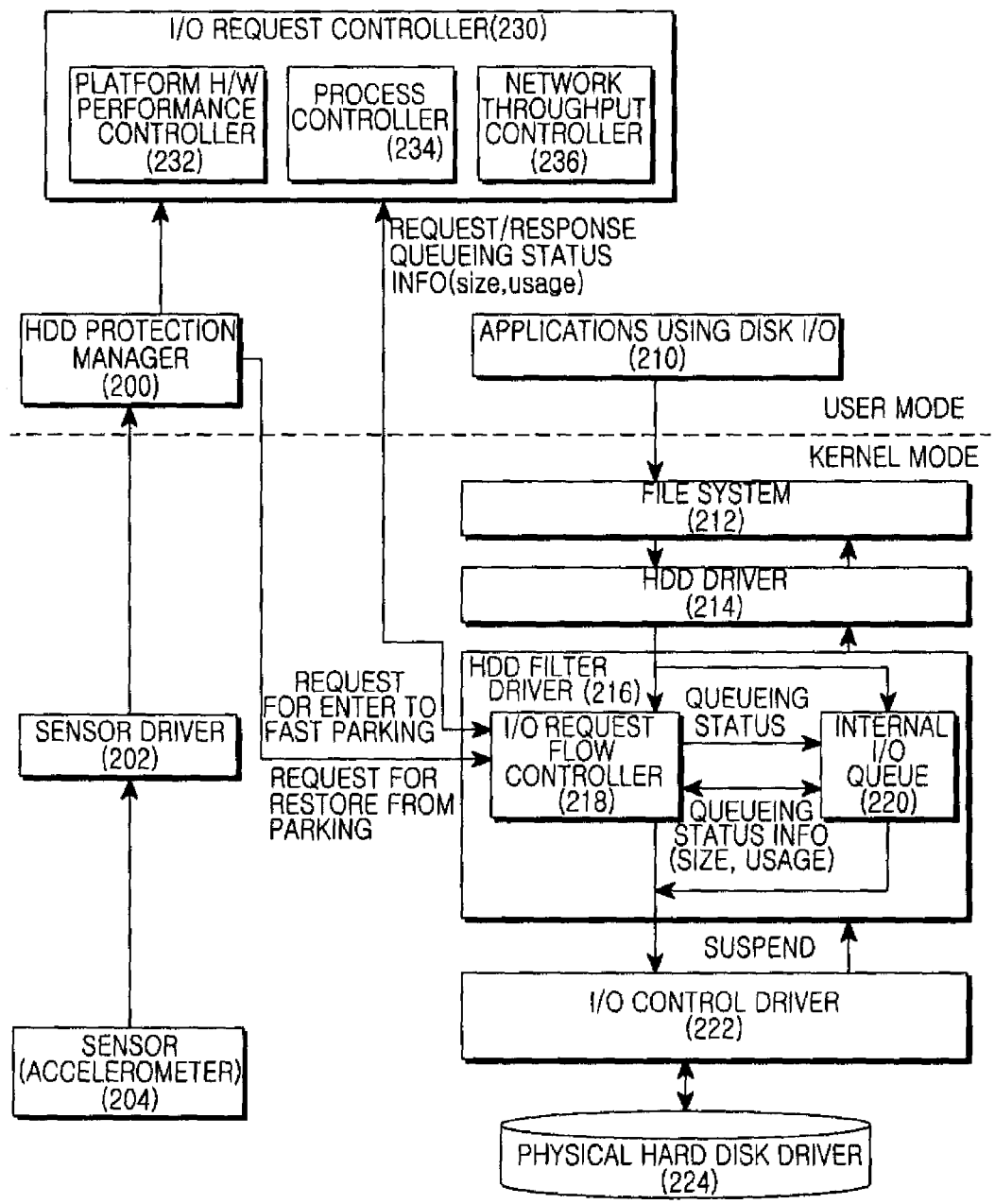
FIG. 2 is a block diagram illustrating a configuration for protecting HDD in a computer system according to the present invention.

FIG. 2 is a block diagram illustrating a configuration for protecting Hard Disk Drive (HDD) in a computer system according to the present invention.

Referring to FIG. 2, a computer system includes an HDD protection manager 200, a sensor driver 202 an accelerometer sensor 204, applications using disk I/O 210, a file system 212, an HDD driver 214, an HDD filter driver 216, an I/O control driver 222, a physical hard disk driver 224, and an I/O request controller 230. Here, the HDD filter driver 216 includes an I/O request flow controller 218 and an internal I/O queue 220. The I/O request controller 230 includes a platform Hardware (H/W) performance controller 232, a process controller 234, and a network throughput controller 236.

The HDD protection manager 200 receives an acceleration value periodically measured by the accelerometer sensor 204 via the sensor driver 202. On the basis of the acceleration value, the HDD protection manager 200 determines if the current system is in a stable status or an unstable status. Here, the accelerometer sensor 204 may measure accelerations of an X axis, a Y axis, and a Z axis, and may measure the accelerations of only the X axis and Y axis.

If it is determined that the current system is in the unstable status, the HDD protection manager 200 outputs a signal requesting the movement of a magnetic head to a safe zone, to the HDD filter driver 216 and, according to the present invention, the HDD protection manager 200 outputs a signal indicating that the system is in an unstable status, to the I/O request flow controller 230. On the other hand, if it is determined that the system is changed from the unstable status to a stable status, the HDD protection manager 200 outputs a signal requesting restoration of the magnetic head to the original position, to the HDD filter driver 216 and, according to the present invention, the HDD protection manager 200 outputs a signal indicating that the system is in the stable status, to the I/O request flow controller 230.

If the signal requesting movement of the magnetic head to the safe zone is input from the HDD protection manager 200, the HDD filter driver 216 provides the signal requesting movement to the safe zone to the physical hard disk driver 224 via the I/O control driver 222. Here, the HDD filter driver 216 prevents all I/O requests forwarded from the HDD driver 214 (i.e., an upper driver) from being forwarded to the I/O control driver 222, using an I/O request flow controller 218. That is, the HDD filter driver 216 stores, in an internal I/O queue 220, all I/O requests forwarded from the HDD driver 214 such that the I/O requests are not forwarded to the I/O control driver 222 while the unstable status is kept. Here, the I/O request is generated in the applications using disk I/O 210, and is forwarded to the HDD filter driver 216 via the file system 212 and the HDD driver 214.

Furthermore, according to the present invention, the HDD filter driver 216 determines status information of the internal I/O queue 220 and provides the status information to the I/O request controller 230. Here, the status information of the internal I/O queue 220 includes a size and a present usage of the internal I/O queue 220. This is for the I/O request controller 230 to select and use a technique suitable to restricting the I/O request generation depending on the status information of the internal I/O queue 220.

On the other hand, if a signal requesting restoration of the magnetic head to the original position is input from the HDD protection manager 200, the HDD filter driver 216 forwards all I/O requests having been stored in the internal I/O queue 220, to the physical hard disk driver 224 via the I/O control driver 222.

If the signal requesting movement of the magnetic head to the safe zone is input through the I/O control driver 222, the physical hard disk driver 224 moves the magnetic head to the safe zone. If I/O requests are input through the I/O control driver 222, the physical hard disk driver 224 moves the magnetic head into position near the platter surface and then, performs physical I/O corresponding to the inputted I/O requests.

The I/O request controller 230 restricts the generation of an I/O request while the system is in the unstable status according to the present invention. That is, the I/O request controller 230 receives information on whether the system is in the stable status or the unstable status from the HDD protection manager 200 and, while the system is in the unstable status, the I/O request controller 230 restricts the generation of an I/O request within the system through a platform H/W performance control, a process control, or a network throughput control. Here, the I/O request controller 230 monitors and stores status information of the system before restricting the generation of the I/O request and, if the system is changed from the unstable status to the stable status, the I/O request controller 230 restores the system in the order of the status information stored. Here, the status information of the system monitored by the I/O request controller 230 is information on a status or value that the I/O request controller 230 controls or changes restriction of the generation of a disk I/O request as described below.

While the system is in the unstable status, the I/O request controller 230 restricts the generation of an I/O request using the platform H/W performance controller 232, the process controller 234, and the network throughput controller 236.

If the system is changed to the unstable status, the platform H/W performance controller 232 acquires and stores H/W status information of the current system through monitoring and change setting of platform H/W. By doing so, the platform H/W performance controller 232 reduces the whole hardware performance of the system and restricts the generation of an I/O request. Here, the platform H/W refers to a processor and a platform chipset (or a South Bridge Chipset). That is, the platform H/W performance controller 232 changes settings of the platform H/W using a technique of changing Performance States (P-States) of all processors (e.g., a single processor, a multi-processor, and a multi-core processor) within a system, a technique of changing on-demand clock modulation duty-cycles of processors, or a technique of performing platform chipset thermal throttling. By doing so, the platform HAN performance controller 232 restricts the generation of an I/O request. Here, the P-State of the processor is described in the Advanced Configuration and Power Interface (ACPI) standard, which is well-known in the art and need not be discussed in detail herein.

The P-State is marked in a form of 'Px'. In case where there are 'P0' to 'Pn', the 'P0' means maximum performance capability, and the 'Pn' means minimum performance capability. That is, the 'Px' means low performance as an 'x' value increases.

Figure 3:
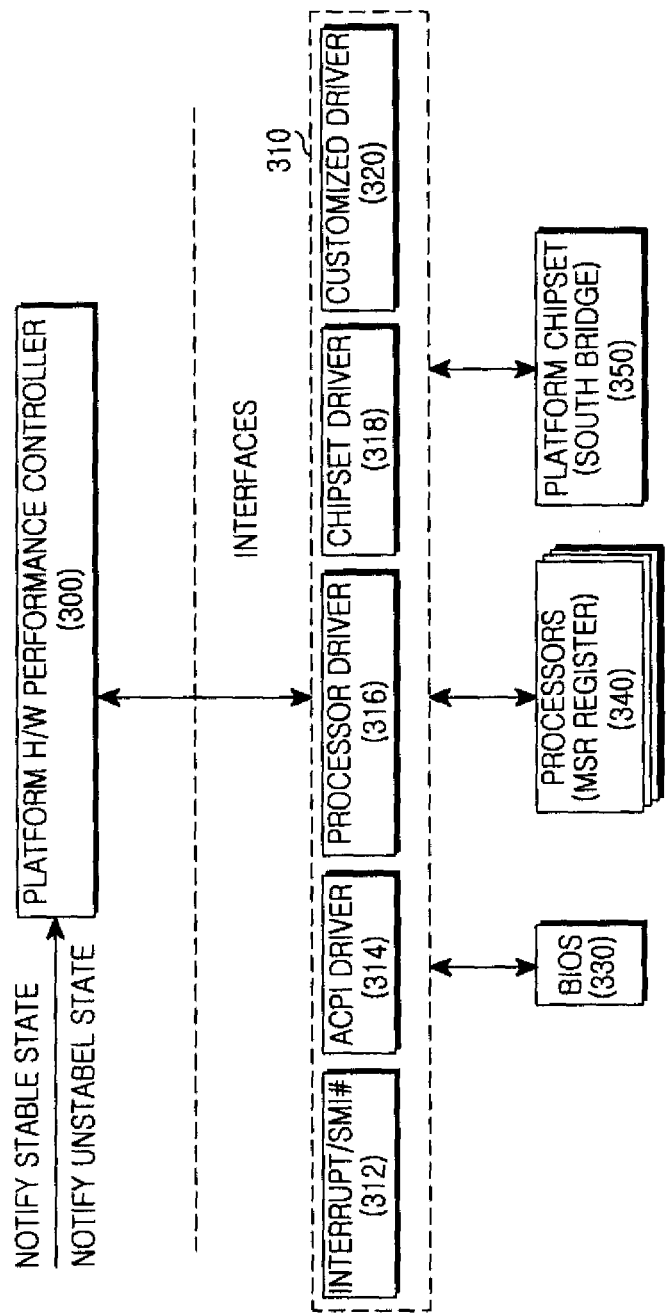
FIG. 3 is a block diagram illustrating a configuration for restricting a disk Input/Output (I/O) request in a computer system according to an exemplary embodiment of the present invention.

As illustrated in FIG. 3, in order to change the setting of the platform H/W, the platform H/W performance controller 300 interfaces with a Basic Input/Output System (BIOS) 330, processor(s) 340, a platform chipset 350 using a System Management Interrupt (SMI#) 312, an ACPI driver 314, a processor driver 316, a chipset driver 318, and a separate customized driver 320. After that, if the system is changed from the unstable status to the stable status, the platform H/W performance controller 300 restores system H/W values on the basis of the stored status information.

However, while the system is in the unstable status, the platform H/W performance controller 300 uses each of the three techniques according to the queue status information or, according to a preset scenario, the platform H/W performance controller 232 independently uses one technique or uses a combination of one or more techniques.

Figure 4:
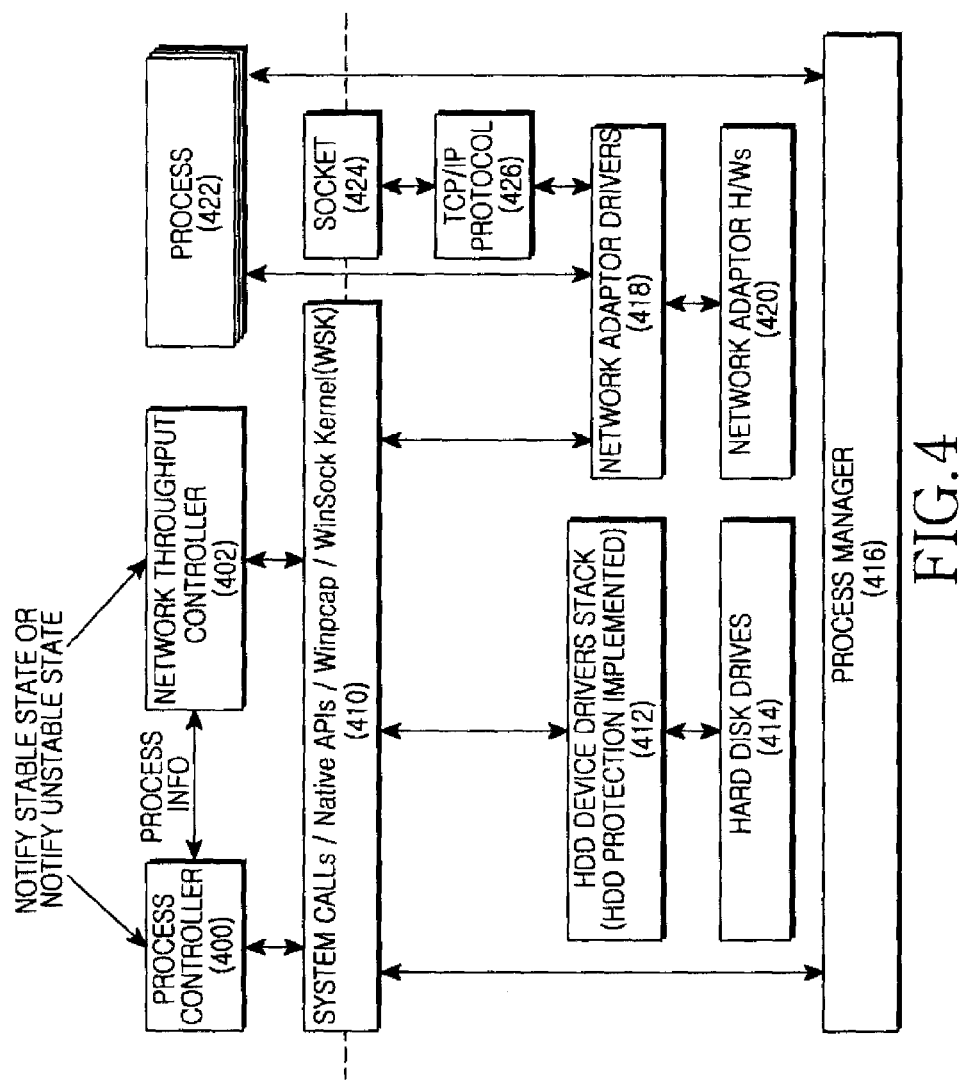
FIG. 4 is a block diagram illustrating a configuration for restricting a disk I/O request in a computer system according to another exemplary embodiment of the present invention.

If the system is changed to the unstable status, the process controller 234 acquires and stores a disk I/O request usage for all processes of a current system through monitoring and change states of execution of the processes. By doing so, while the system is in the unstable status, the process controller 234 restricts the generation of disk I/O requests from the respective processes. That is, while the system is in the unstable status, the process controller 234 restricts the generation of a disk I/O request using a technique of changing each process into a software-frozen state or a technique of lowering Operating System (OS) scheduling priority of each process. Here, the frozen state means a state in which a process is suspended to perform no further operations or commands. In the process of the frozen state, the disk I/O usage is reduced to zero ('0'). Also, if the scheduling priority of the process is lowered, the disk I/O usage is decreased. This is because an OS gives a process of lower scheduling priority a chance to use a processor of a system while simultaneously executing several processes. Here, as illustrated in FIG. 4, by interfacing with a process manager 416 using Application Programming Interfaces (APIs) 410 provided by the system, the process controller 400 can acquire disk I/O information of all processes 422, which are in execution in the current system, and can freeze one or more of the processes 422 or change their priority. Here, the APIs 410 can be system calls, native APIs provided by the kernel, Wincap, or WinSock Kernel (WSK). If the system is changed from the unstable status to the stable status, the process controller 400 shall restore frozen processes and restore the priority of the processes to their original level Here, while the system is in the unstable status, the process controller 400 can use all or only one of the techniques of freezing the process and the technique of changing the priority depending on queue status information. Also, the process controller 400 may use a method alternately using the two techniques depending on queue status information, an expected impact amount, and an expected impact sustain time.

The network throughput controller 236 (FIG. 2) monitors a network usage of the current system, information on a window size for a send/receive buffer of a Transmission Control Protocol/Internet Protocol (TCP/IP) protocol, network adapter information, and a correlation between the network usage and a disk I/O request. If the system is changed to the unstable status, the network throughput controller 236 stores the monitored information, controls a network throughput, and restricts the generation of a disk I/O request caused by network use. The network throughput controller 236 can control a network throughput using a technique of controlling a window size for a send/receive buffer of a TCP/IP protocol, a technique of changing a Maximum Transfer Unit (MTU), and a technique of changing a link speed of a network adapter H/W. At this time, as illustrated in FIG. 4, the network throughput controller 402 can interface with the TCP/IP protocol 426 using the APIs 410 provided by the system and change a window size of a send/receive buffer and an MTU size, and can interface with the network adapter driver 418 and change the link speed of the network adapter H/W 420. Here, the APIs 410 can be system calls, native APIs provided by a kernel, Wincap, or WinSock Kernel (WSK). If the system is changed from the unstable status to the stable status, the network throughput controller 402 restores the network state of the current system to its original level according to the stored monitoring information.

Here, while the system is in the unstable status, depending on queue status information, the network throughput controller 402 may use at least one of the window size changing technique, the MTU changing technique, and the link speed changing technique, independently or a combination of one or more the aforementioned techniques.

The I/O request controller 230 (FIG. 2) may restrict the generation of the I/O request using all of techniques each used in the platform H/W performance controller 232, the process controller 234, and the network throughput controller 236, and may restrict the generation of the I/O request using one or more techniques. At this time, the I/O request controller 230 can select a suitable technique depending on status information of a queue provided from the HDD filter driver 216. For example, if a usage of the queue is higher than a threshold value as a result of identifying the status information of the queue, the I/O request controller 230 can increase a strength restricting the generation of an I/O request using several techniques. If the usage of the queue is lower than the threshold value, the I/O request controller 230 can decrease a strength restricting the generation of an I/O request using one or two techniques.

The above description is made for a configuration having a separate I/O request controller 230 controlling the generation of an I/O request and operating with an HDD protection manager 200 through an interface. Although the I/O controller is shown separately, it would be understood by those skilled in the art that the I/O request controller 230 can be included within the HDD protection manager 200.

Figure 5:
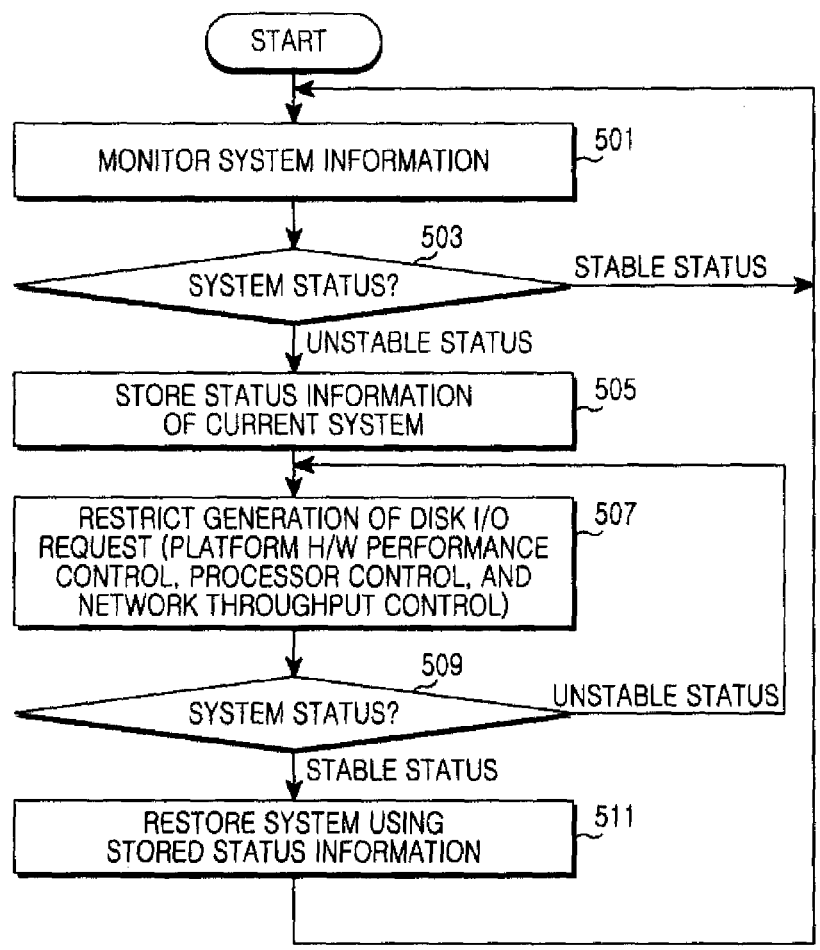
FIG. 5 is a flow diagram illustrating an process for restricting a disk I/O request in a computer system according to an exemplary embodiment of the present invention.

FIG. 5 is a flow diagram illustrating an procedure for restricting a disk I/O request in a computer system according to an exemplary embodiment of the present invention.

Referring to FIG. 5, in step 501, a computer system monitors information of the system. For example, the system monitors status information of a platform H/W, status information on a process, and status information on a network.

At step 503, the system determines if the current system is in a stable status or an unstable status. Here, the system determines if the current system is in the stable status or the unstable status capable of experiencing impact, using an acceleration value periodically measured through an accelerometer sensor. If the current system is in the stable status, the system returns to step 501 and continuously monitor the status information of the system.

On the other hand, if the current system is in the unstable status, in step 505, the system stores the monitored status information of the system and in step 507, restricts the generation of a disk I/O request within the system through a platform H/W performance control, a process control, or a network throughput control.

In step 509, the system determines if the current system is in the stable status or the unstable status. When the system is still in the unstable status, the system returns to step 507 and continuously restricts the generation of the disk I/O request.

On the other hand, if the current system is in the stable status, the system restores the system to the original on the basis of the stored status information of the system. The system returns to step 501 to monitor system information.

Figure 6:
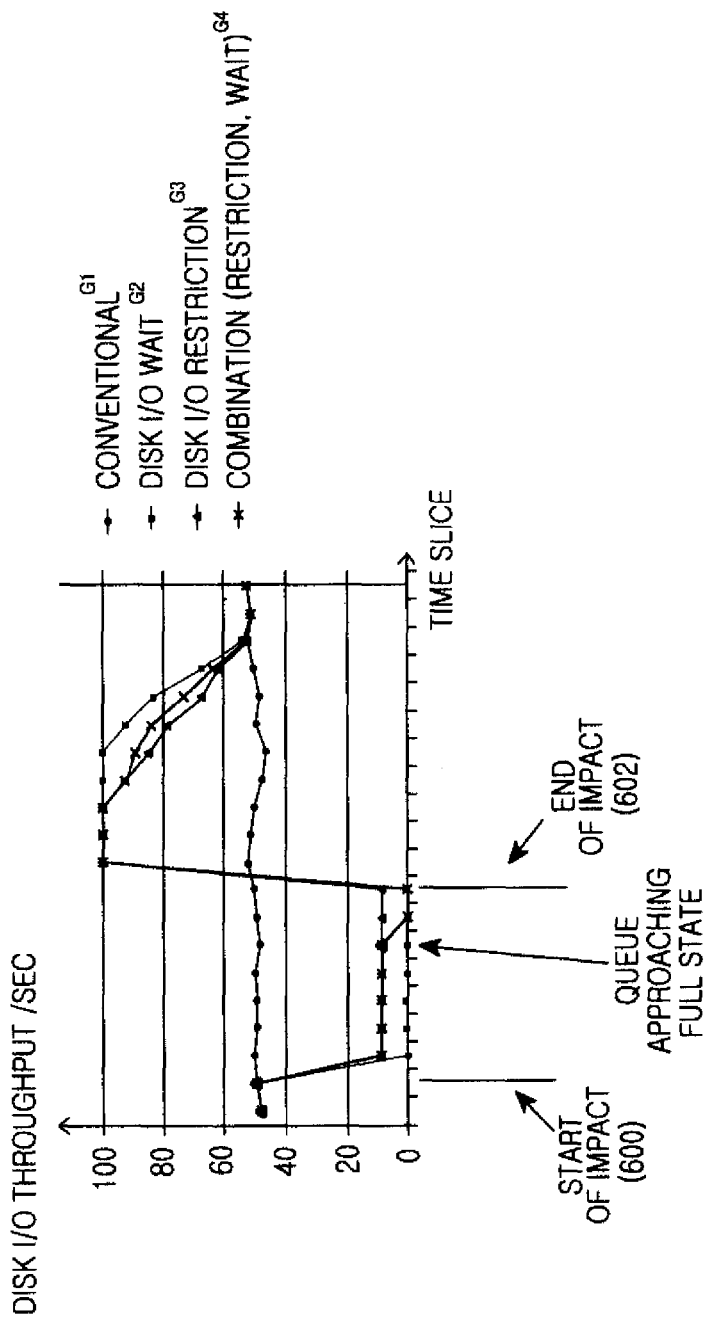
FIG. 6 is a graph illustrating disk I/O throughputs in computer systems according to the present invention and the conventional art.

FIG. 6 illustrates disk I/O throughputs in computer systems according to the present invention and the conventional art. Here, horizontal axis represents time, the vertical axis represents disk I/O throughput per second, 'G1' represents a disk I/O throughput of a conventional computer system, and 'G2', 'G3', and 'G4' represent disk I/O throughputs of a computer system according to the present invention.

Referring to FIG. 6, the conventional computer system may continuously generate a disk I/O request even in an unstable status, thus causing a phenomenon in which a queue within an HDD filter driver is overflowed. Unlike this, the computer system according to the present invention waits or restricts the generation of a disk I/O request between an impact start time point (600) and an impact end time point (602) to generate no disk I/O requests or disk I/O requests of a low rate during the unstable status. By doing so, the computer system can prevent the phenomenon in which the queue within the HDD filter driver overflows.

As described above, in an exemplary embodiment of the present invention, there is an advantage in which simple application to a conventional system can be made at less cost and, even in case of a malfunction, restoration is easy and danger is low because it is set to restore a system to the original state on system booting without a permanent change of system setting.

An exemplary embodiment of the present invention has an effect of restricting the generation of a disk I/O request while a computer system is in an unstable status, thereby being able to prevent an overflow of a queue storing disk I/O requests during the unstable status and, through this, being able to maintain system stability and prevent a loss or damage of user data.

The above-described methods operable in one or more of the illustrated controllers according to the present invention can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A buffer overflow prevention method for Hard Disk Drive (HDD) protection in a computer system, the method, operable in a controller, comprising:

measuring acceleration information of the system;

determining if the system is in a stable status or an unstable status using the measured acceleration information; and if determined that the system has become unstable, moving a magnetic head to a safe zone to prevent I/O access to the HDD, and preventing overflow of a buffer queuing data to be stored on the HDD by restricting the generation of a disk Input/Output (I/O) request to be inputted to the buffer, in a manner preventing loss of user data;

wherein the system restricts the generation of the disk I/O request using a technique of controlling platform HardWare (H/W) performance comprising at least one of a technique of changing Performance State (P-State) for changing a performance capability of at least one system processor, a technique of changing, on-demand clock modulation duty-cycle, and a technique of performing platform chipset thermal throttling;

wherein the system determines the number of techniques to be used for restricting the generation of the disk I/O request according to relation of a usage of a queue with a threshold value.

2. The method of claim 1, wherein the system restricts the generation of the disk I/O request further by using a control of a process running in the system, and the process running in the system is controlled using at least one of a process suspension and a change of scheduling priority of a process.

3. The method of claim 1, wherein the system further restricts the generation of the disk I/O request using at least a control of network throughput using at least one of: a change of a window size of a send/receive buffer of a Transmission Control Protocol/Internet Protocol (TCP/IP) protocol, a change of a size of a Maximum Transfer Unit (MTU), and a change of a link speed of a network adapter.

4. The method of claim 1, further comprising:
storing in a buffer disk I/O requests that are generated while the system is in the unstable status;
identifying a usage of the buffer.

5. The method of claim 1, further comprising:
monitoring status information of a system;
storing the monitored status information of the system when the system is in the unstable status; and
upon the end of the unstable status, restoring the system using the stored status information.

6. A controlling apparatus including a buffer overflow prevention method for Hard Disk Drive (HDD) protection in a computer system, the controlling apparatus comprising:
a protection manager for determining if the system is in a stable status or an unstable status using an acceleration value of the computer system;
a physical hard disk driver which moves a magnetic head to a safe zone to prevent I/O access to the HDD while the system is in the unstable status; and
an Input/Output (I/O) request controller for restricting the generation of a disk I/O request to be inputted to a buffer queuing data to be stored on the HDD to avoid overflow of the buffer while the system is in the unstable status, in a manner preventing loss of user data;
wherein the I/O request controller restricts the generation of the disk I/O request using a technique of controlling of platform HardWare (H/W) performance comprising at least one of a technique of changing Performance State (P-State) for changing a performance capability of at least one system processor, an technique of changing on-demand clock modulation duty-cycle, and a technique of performing platform chipset thermal throttling,
wherein the I/O request controller determines the number of techniques to be used for restricting the generation of the disk I/O request according to relation of a usage of a queue with a threshold value.

7. The apparatus of claim 6, wherein the I/O request controller restricts the generation of the disk I/O request further by using a control of a process running in the system, and controls the process running in the system using at least one of: a process suspend and a change of scheduling priority of a process.

8. The apparatus of claim 6, wherein the I/O request controller restricts the generation of the disk I/O request using at least the control of network throughput, selected from at least one: of a change of a window size of a send/receive buffer of a Transmission Control Protocol/Internet Protocol (TCP/IP) protocol, a change of a size of a Maximum Transfer Unit (MTU), and a change of a link speed of a network adapter.

9. The apparatus of claim 6, wherein the I/O request controller monitors status information of the system, when the system is in the unstable status, stores a current monitored status information of the system, and upon the end of the unstable status, restores the system using the stored current status information.

10. An I/O request controller for controlling I/O operations of a hard disk drive (HDD) in a computer system, the computer system including a physical hard disk driver which moves a magnetic head to a safe zone to prevent I/O access to the HDD while the system is in an unstable status, the I/O request controller comprising:
a platform performance controller for monitoring and controlling non-HDD performance operations of the computer system through a control of platform HardWare (H/W) performance comprising at least one of a technique of changing Performance State (P-State) for changing a performance capability of at least one system processor, technique of changing on-demand clock modulation duty-cycle, and a technique of performing platform chipset thermal throttling;
a process controller for monitoring and controlling non-HDD process operations within the computer system, and
a network throughput controller for monitoring and controlling network interface operations of the computer system,
each of the performance controller, the processor controller and the network throughput controller, in response to an indication of the unstable status, adjusting the respective operations to restrict the generation of a disk I/O request to be inputted to a buffer queuing data to be stored on the HDD while the system is in the unstable status, to avoid overflow of the buffer in a manner preventing loss of user data,
wherein the system determines the number of techniques to be used for restricting the generation of the disk I/O request according to relation of a usage of a queue with a threshold value.

11. The controller of claim 10 wherein the processor controller adjusts the process operations running within the computer system using at least one of: a process suspend and a change of scheduling priority of a process.

12. The controller of claim 10, wherein the network throughput controller adjusts the network interface operations of the computer system using at least one: of a change of a window size of a send/receive buffer of a Transmission Control Protocol/Internet Protocol (TCP/IP) protocol, a change of a size of a Maximum Transfer Unit (MTU), and a change of a link speed of a network adapter.

13. The controller of claim 10, further comprising:
a sensor for measuring acceleration of the computer system to determine an unstable condition of the computer system, and storing a current computer system operation when the unstable condition is determined.

* * * * *

UNITED STATES PATENT AND TRADEMARK OFFICE
CERTIFICATE OF CORRECTION

| | | |
|---|---|---|
| PATENT NO. | : 8,516,168 B2 | Page 1 of 1 |
| APPLICATION NO. | : 12/758889 | |
| DATED | : August 20, 2013 | |
| INVENTOR(S) | : Bum Keun Kim | |

It is certified that error appears in the above-identified patent and that said Letters Patent is hereby corrected as shown below:

In the Claims

Column 9, Claim 6, Lines 58-59 should read as follows:
"...technique of controlling platform..."

Column 9, Claim 6, Line 62 should read as follows:
"...processor, a technique of..."

Column 10, Claim 10, Line 34 should read as follows:
"...processor, a technique of..."

Signed and Sealed this
Fifteenth Day of October, 2013

Teresa Stanek Rea
*Deputy Director of the United States Patent and Trademark Office*